July 2, 1940.   H. A. WAGNER ET AL   2,206,857
FOLDING TRUCK FOR LAUNDRY BASKETS
Filed April 27, 1939   2 Sheets-Sheet 1
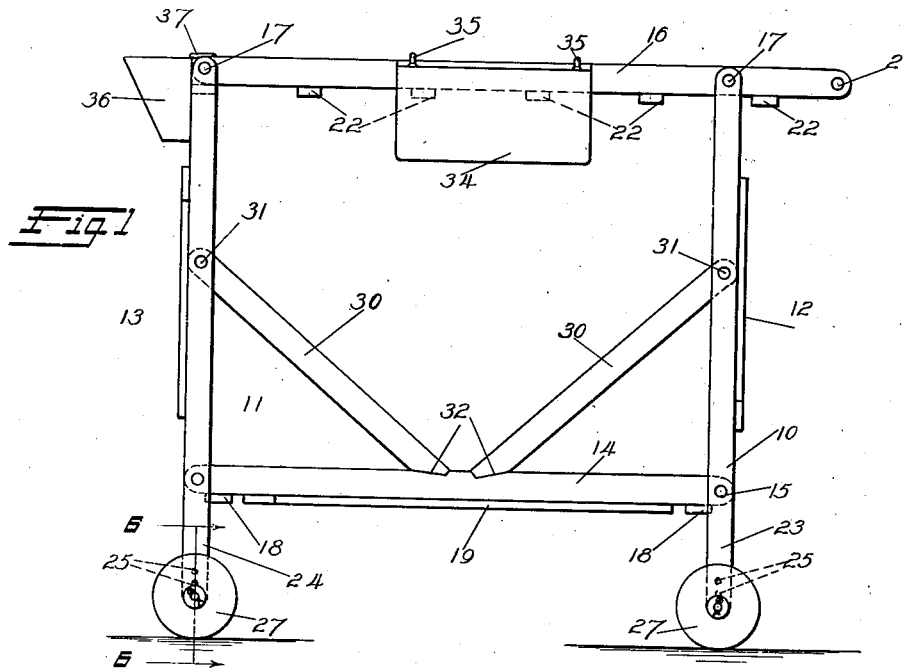
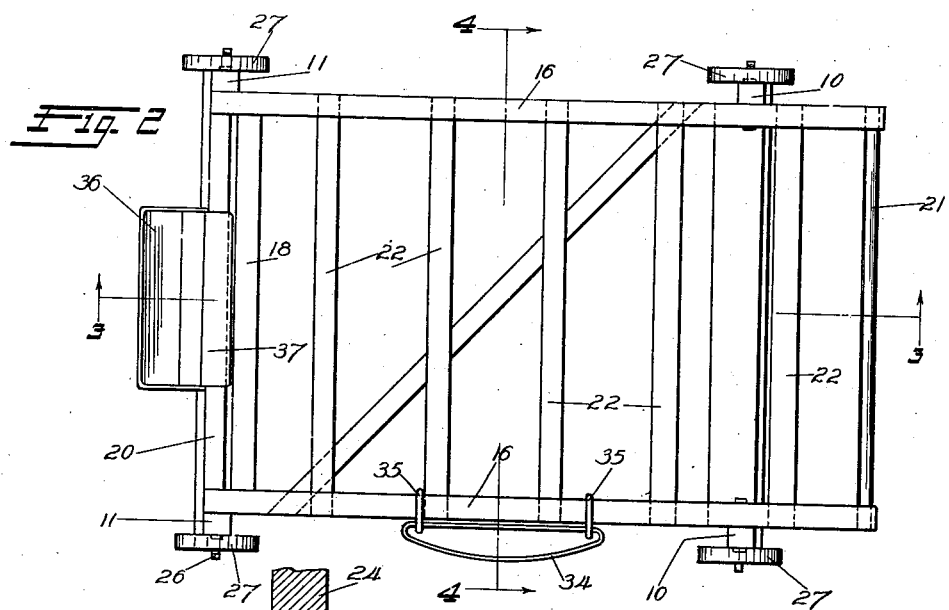
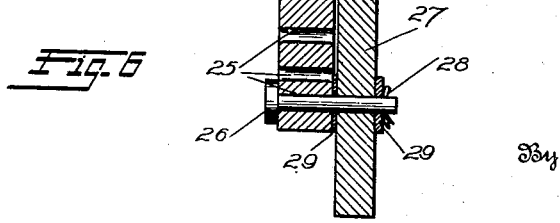
Inventors
Henry A. Wagner
John Gahagan

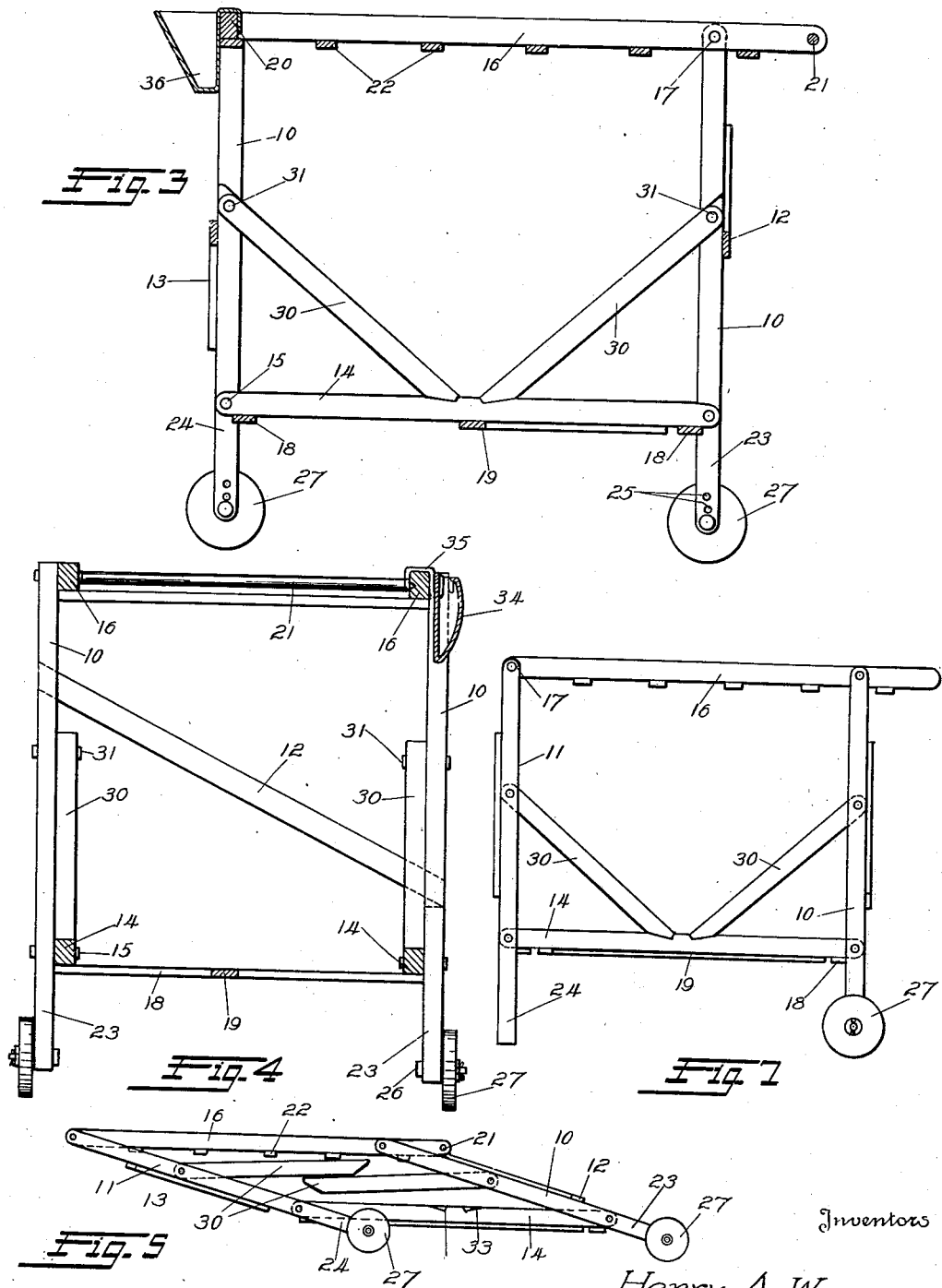

Patented July 2, 1940

2,206,857

UNITED STATES PATENT OFFICE 2,206,857

FOLDING TRUCK FOR LAUNDRY BASKETS

Henry A. Wagner, Etna, and John Gahagan, Sharpsburg, Pa.

Application April 27, 1939, Serial No. 270,422

2 Claims. (Cl. 280—36)

This invention relates to an improved folding truck adapted to support laundry baskets in an elevated position convenient for use while hanging clothes on or removing them from a line.

More particularly, it is an object of this invention to provide an improved skeleton truck having a frame constructed to fold to permit the device to be stored in a limited space.

A further object of the invention is to provide a truck which will be very light in weight yet sufficiently durable to support a fully laden laundry basket and provided with wheels or rollers to permit the truck to be rolled from place to place with the basket supported thereon.

Another object of the invention is to provide pairs of diagonally disposed opposed pivotally connected braces to maintain the truck in an upright position, which are readily releasable for folding the truck and which are adapted to collapse into an overlapping position when the truck is folded.

Other objects and advantages of the invention will hereinafter become more fully apparent from the following description of the drawings, which illustrate a preferred form of the device, and wherein:

Figure 1 is a side elevational view of the truck in an upright position,

Figure 2 is a top plan view of the same,

Figure 3 is a vertical central sectional view taken on the lines 3—3 of Figure 2, Figure 4 is a cross sectional view taken on the lines 4—4 of Figure 2, Figure 5 is a side elevational view of the truck in a collapsed position, Figure 6 is a vertical sectional view taken on the lines 6—6 of Figure 1, and Figure 7 is a view similar to Figure 1, on a reduced scale, showing a slightly modified form of the invention.

Referring more particularly to the drawings wherein like reference characters designate like or corresponding parts throughout the different views, the truck includes the four upright corner members designated 10 and 11. The upright members 10 and 11 are respectively connected rigidly by the diagonally disposed braces 12 and 13 respectively. The uprights 10 and 11 are connected adjacent their bottom or lower ends by the lower longitudinally disposed members 14, the ends of each of said members being pivotally connected by means of the fastenings 15 to one of the uprights 10 and one of the uprights 11 as best seen in Figure 4. Disposed above the members 14 are the members 16 which are pivotally connected at 17 to the upper ends of the uprights 10 and 11 to complete the rectangular frame of the truck.

The members 14 are connected by the two transverse braces 18 and by the diagonally disposed brace 19, while the members 16 are connected at one end by the transverse bar 20. The opposite ends of the members 16 extend beyond the uprights 10 and are connected by a rod 21 forming a handle. Members 16 are also connected by the spaced slats 22 which are secured to the lower edges of the members 16 to form a platform adapted to support a laundry basket or the like.

The depending ends 23 and 24 respectively of the uprights 10 and 11 are provided with spaced openings 25 disposed one above the other to selectively receive a bolt 26 on the free end of which is journaled a wheel 27. Wheels 27 are held in engagement with the bolts 26 by cotter pins or other suitable fastenings 28 and are held in spaced relationship to the legs 24 and 23 and to the fastenings 28 by washers 29. The elevation of the truck may be varied by positioning the bolts 26 in different corresponding openings 25 in each of the legs 23 and 24.

In order to maintain the truck in an upright position, brace members 30 are provided one of which is pivotally connected at an end to the intermediate portion of each of the uprights 10 and 11, as indicated at 31. The free ends of the brace members 30 are bevelled on their under side at 32 to fit the tapering notches 33 in the upper edge of each of the members 14 as seen in Figure 1. Notches 33 may best be seen in Figure 5 showing the truck in a collapsed position. Braces 30 when in engagement with the notches 33 are diagonally disposed relatively to the uprights 10 and 11 and the longitudinal members 14 to retain said parts in rigid position relatively to each other, thereby maintaining the laundry truck in an upright position. Braces may readily be disengaged from the notches 33 by swinging them upwardly so that the truck may readily be collapsed with ends 32 of the braces 30 disposed in overlapping relationship as seen in Figure 5.

When the laundry truck is intended to be used on unlevel surfaces where there would be a tendency for it to roll away from a desired position if not held, one pair of the wheels 27 may be dispensed with and either the legs 23 or 24 elongated as seen in Figure 7 to convert the device into a two-wheeled truck which can only be rolled when tilted to raise the elongated legs out of engagement with the ground, as seen in Figure 7. A bag 34 having supporting hooks 35, or a sheet metal trough 36 having a hook-shaped bracket 37, may be supported by means of the hooks 35 or bracket 37 on either of the longitudinal members 16 or the bar 20 to function as a container for clothespins.

The truck is intended to be pushed or pulled by grasping the handle 21 to convey a laundry basket, filled with clothes, to or from the lines on which they are to or have been hung. When not in use, the truck is collapsed by swinging the braces 30 upwardly after which the truck may be pushed or pulled in either direction while holding one of the wheels 27 to thereby cause it to collapse into the position seen in Figure 5 so that it may readily be stored in a relatively small space until again needed for use. The uprights, the pivotally connected longitudinal members, the rigid pivotally connected braces and slats are all preferably of wood so that the entire truck will be very light in weight permitting it to be readily lifted after collapsing for storage or when it is set up for use.

Obviously, various modifications and changes in the particular construction and arrangement of the parts forming the invention may be made and are contemplated and the right is reserved to make such variations and changes as do not depart from the spirit and scope of the invention as hereinafter defined by the appended claims.

We claim as our invention:

1. In a laundry truck, a frame having pairs of spaced upright corner members connected by transverse braces, pairs of longitudinally disposed side members pivotally connected to the upright members, one pair of said side members having transverse slats forming a platform adapted to support a laundry basket or the like, and brace members pivotally mounted on said upright members between said pairs of side members with their free ends shaped to removably engage notches in one pair of said side members to retain the truck in an upright position, said pivotally connected braces being swingable out of engagement with the notches to permit said truck to be collapsed.

2. A laundry truck comprising a platform, a leg pivotally connected to each corner thereof and depending therefrom, transverse braces connecting the legs of each end of the platform, longitudinal braces pivotally connecting the legs at each side of the paltform and adjacent their lower ends, said longitudinal braces having spaced notches in their upper edges, intermediate of their ends, and diagonal braces pivotally connected intermediate of their ends to the legs and having their free ends tapered to fit said notches for supporting the truck in an upright position.

HENRY A. WAGNER.
JOHN GAHAGAN.